United States Patent Office 3,511,621
Patented May 12, 1970

3,511,621
PROCESS FOR RECOVERING URANIUM AS URANIUM DIOXIDE
Tomitaro Ishimori, Mito-shi, and Kaoru Ueno and Eiko Akatsu, Naka-gun, and Michiko Kawasaki, Hitachi-shi, Japan, assignors to Japan Atomic Energy Research Institute
Filed Jan. 31, 1968, Ser. No. 702,051
Claims priority, application Japan, Feb. 3, 1967, 42/6,558
Int. Cl. C01g 43/02
U.S. Cl. 23—355
5 Claims

ABSTRACT OF THE DISCLOSURE

Tri-n-butyl phosphate (TBP) containing uranyl nitrate complex was directly distilled. It was found that the distillation residue gives $UO_2$ upon ignition.

BACKGROUND OF THE INVENTION

Figure 1:
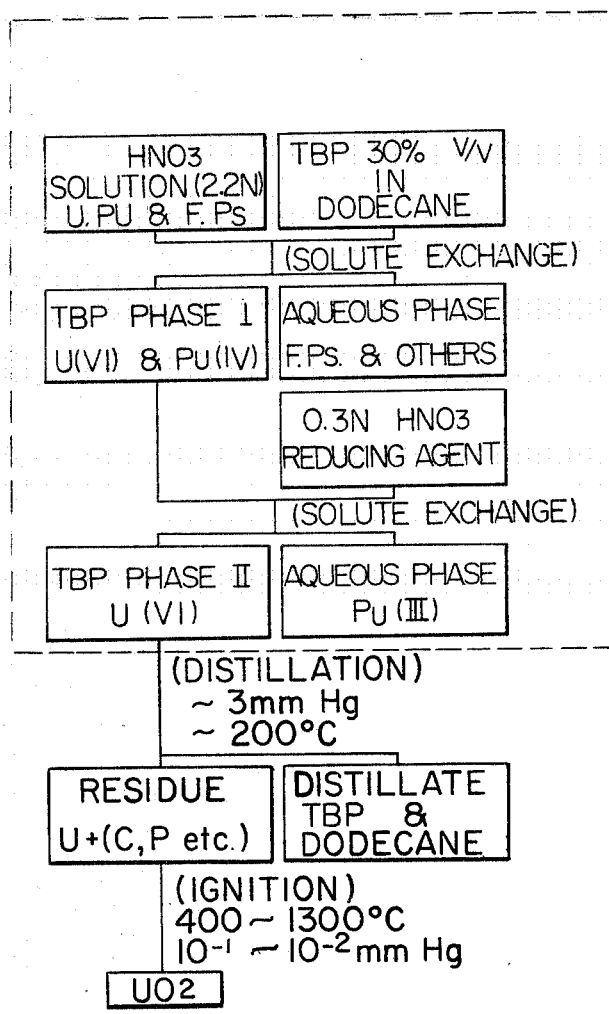
FIG. 1 is a flow diagram comparing the conventional Purex process as an example and a modified Purex process based on this invention as an example.

In the so-called Purex process, which is an established method for reprocessing spent uranium reactor fuel, the spent uranium fuel is dissolved in diluted aqueous nitric acid solution (usually 1–3 N), the nitric acid solution is treated with an organic extractant comprising tri-n-butyl phosphate hereinafter referred to as TBP, and a suitable organic diluent (usually less than 50% TBP by volume), whereby U(VI) (hexavalent uranium) and Pu(IV) (tetravalent plutonium) are extracted into the TBP phase (TBP phase I) and the fission products remain in the aqueous phase. Then the TBP phase is treated with a diluted nitric acid solution (usually 0.1–0.6 N) containing a suitable reducing agent, whereby the plutonium in the TBP phase is reduced to the trivalent state and is back-extracted into the nitric acid solution. The remaining TBP phase (TBP phase II) contains only hexavalent uranium (uranyl nitrate). From this TBP phase the uranium value is again back-extracted into an aqueous nitric acid solution and precipitated by adding ammonia and then the precipitate is ignited to produce $U_3O_8$, which is then converted to $UO_2$ by reduction with hydrogen. (Refer to FIG. 1.)

Figure 2:
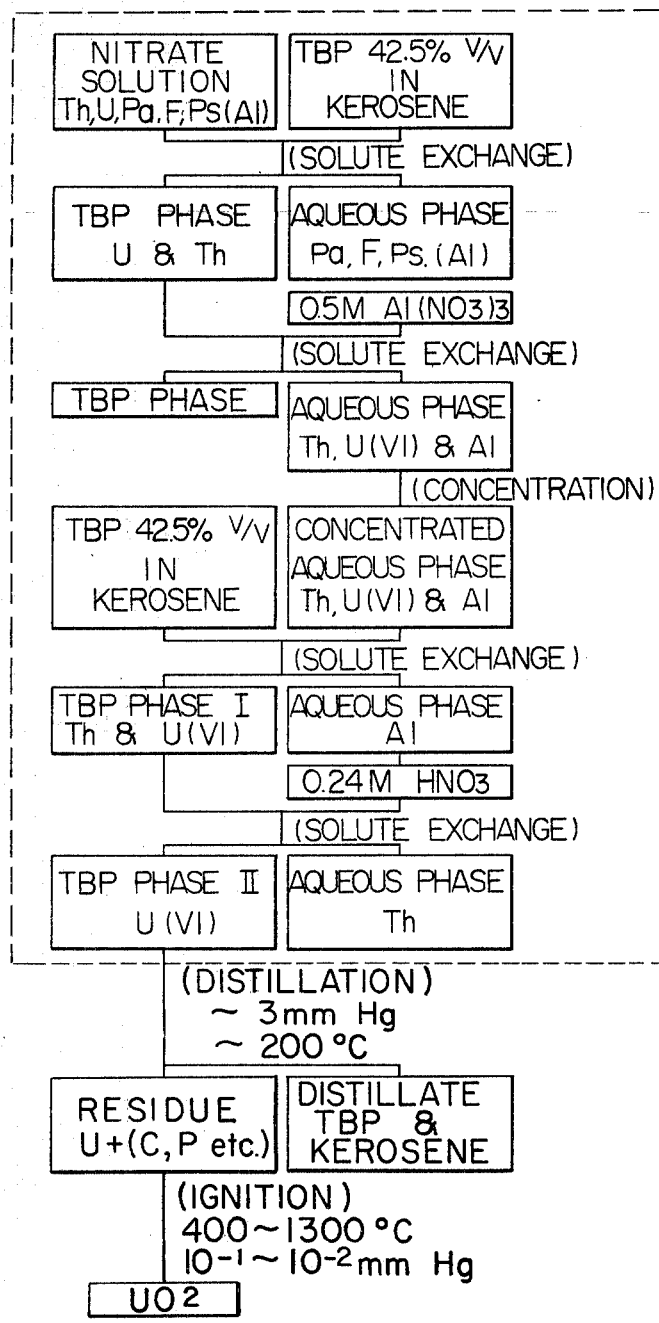
FIG. 2 is a flow diagram comparing the conventional Thorex process as an example and a modified Thorex process based on this invention as an example.

In the so-called Thorex process, which is also an established method for reprocessing spent thorium reactor fuel, the spent fuel is converted to an aqueous nitrate solution, treated with an organic extractant comprising TBP and a suitable organic diluent (usually less than 50% TBP by volume), whereby uranium and thorium are extracted into the TBP phase and the fission products remain in the aqueous phase. The TBP phase is treated with an $Al(NO_3)_3$ solution, whereby uranium and thorium are again transferred to the aqueous phase. The aqueous phase is concentrated by evaporation and is further extracted with a TBP extractant (less than 50% by volume). This TBP phase (corresponding to TBP phase I in the above-mentioned Purex process) is again treated with a diluted nitric acid (0.2–0.3 N), whereby only thorium is back-extracted to the aqueous phase. In the TBP phase, only uranium remains. This corresponds to TBP phase II in the above-mentioned Purex process, from which the uranium value is again back-extracted into an aqueous nitric acid solution (0.01 N) and precipitated by adding ammonia and then the precipitate is ignited to produce $U_3O_8$, which is then converted to $UO_2$ by reduction with hydrogen. (Refer to FIG. 2.)

According to the present invention the TBP phase II of these processes is directly subjected to vacuum distillation, and the distillation residue is ignited to obtain $UO_2$ in one step. Further, the TBP and diluent recovered by distillation can be used for extraction without any further reprocessing treatment.

Prior to this invention, no one had thought of direct distillation of the TBP phase II, and had only expected that $UO_2$ could be directly obtained by igniting the distillation residue. The reason why this direct method had heretofore been unattainable is that persons skilled in the art throught that it was undesirable to employ different unit operations in one reprocessing process, and also feared the danger of explosion of a system comprising TBP, nitric acid and uranyl nitrate.

SUMMARY OF THE INVENTION

In a broad sense, this invention is a process for recovering uranium as uranium dioxide comprising: extracting an aqueous nitric acid solution containing uranium with an organic solvent containing tri-n-butyl phosphate (TBP), distilling the organic phase under reduced pressure, and igniting the distillation residue under reduced pressure.

There is no limit in the concentration of uranium in the uranyl nitrate solution as the starting material for the process of this invention. This is an established fact.

The process of this invention is applicable as the final steps when uranium ores are treated so as to obtain uranium dioxide and when spent nuclear reactor fuel materials are reprocessed in accordance with the so-called Purex process or Thorex process.

That is to say, in a process for recovering uranium from spent reactor fuel materials which comprises the steps of (1) extracting uranium and plutonium or thorium with an organic solvent containing tri-n-butyl phosphate (TBP) from a nitric acid solution containing uranium and plutonium or thorium along with other metals; (2) repeating solute-exchange between the organic TBP extractant phase and the aqueous phase to collect uranium alone in the TBP phase; and (3) transferring the uranium remaining in the TBP phase into an aqueous phase again, precipitating the uranium by means of ammonia, and igniting the precipitate; the process of this invention takes the place of for the above step (3) and constitutes an improvement with comprises subjecting the TBP phase resulting from the above step (2) to direct vacuum distillation without back-extracting the uranium value into the aqueous solution, igniting the distillation residue which is left after the solvent and TBP are removed, under reduced pressure, so that uranium dioxide may be directly obtained.

When the hot (radiologically dangerous) materials are treated, remote controlled operation or manipulation is necessary, while such care is unnecessary in the treatment of ordinary uranium ores.

The conditions of the vacuum distillation are not critical. The degree of vacuum is determined by the distillation temperature employed. However, the TBP extractant containing uranyl nitrate complex is distilled at a temperature not greater than 210° C. When the distillation is carried out at 210° C., TBP is distilled at about 5 mm. Hg. Of course, before the distillation temperature reaches 210° C., most of the organic diluent (solvent) is distilled off. At temperatures over 210° C., a sudden increase of the pressure inside the distillation vessel is occasionally observed, and this phenomenon may be a sign of an explosive reaction. Therefore, it is desirable or probably necessary to carry out the distillation at a temperature not in excess of 210° C. and at a pressure as low as possible.

The ignition should be carried out in a vacuum of 0.1 mm. Hg or higher. If the pressure is higher than 0.1 mm. Hg, $UO_2$ cannot be obtained. The residue must be finally ignited at least at 1300° C. at the final stage.

The beneficial effect or advantages of the process, when compared with the final steps of the conventional Purex process, are as follows:

(1) Equipment

In the final steps of the Purex process, the following kinds of equipment are required.

(1) Pulse column for back-extracting uranium from the TBP phase II;
(2) Evaporator for concentrating the back-extract;
(3) Tank for precipitating the uranium value with ammonia;
(4) Equipment for filtering the precipitate (yellow cake) formed by precipitation with ammonia;
(5) Furnace for drying the yellow cake and igniting the same to covert to $U_3O_8$;
(6) Equipment for hydrogen reduction; and
(7) Pulse column for washing the used TBP solution after back-extraction of uranium value.

In contrast, in the process of this invention, only
(1) Equipment for fractional vacuum distillation; and
(2) Furnace for igniting the distillation residue under reduced pressure (the ignition may be carried out in two steps, and, in such a case, two separate furnaces can be employed) are required. In this process, therefore, far less equipment is needed; however, all equipment must be gas-tight.

(2) The amounts of Radioactive or Non-Radioactive Effluents

In the final steps of the conventional Purex process, the effluents or wastes include:
(1) Vapor at the stage of evaporating concentration;
(2) A large amount of supernatant liquid remaining after filtering the yellow cake (containing a slight amount of uranium);
(3) A large amount of the alkaline solution used for washing the TBP phase;

while in the process of this invention, the decomposition products of TBP in the effluent gases at the stages of distillation and ignition are the only waste.

(3) Features Compared

In the final steps of the Purex process,
(1) Handling and or treatment of a large amount of the effluent steam containing $HNO_3$ and the alkaline solution, and
(2) Reduction by means of hydrogen involve rather difficult problems, while in the process of this invention, there is no particular difficulty.

(4) Chemicals

Whereas, in the final steps of the Purex process,
(1) Ammonia,
(2) Hydrogen and
(3) Solutions for back-extracting uranium value and so forth are necessary; no special reagents are required in the process of this invention. In addition, the recovered solvent and TBP can be used again without any further reprocessing treatment.

Though the foregoing differences are stated with particular reference to the Purex process, the same can be said with respect to the Thorex process, too.

From the above description, it will be apparent that by directly distilling the above TBP phase II, the amounts and properties of the wastes (effluents) in the process of this invention are far easier to handle, and the kind and number of units of equipment are reduced. This was not conceived by any one prior to this invention.

DETAILED DESCRIPTION OF THE EMBODIMENTS

The invention will now be illustrated by way of the following examples.

Example 1

A nitric acid solution (130 ml.) of a spent uranium fuel comprising:

1.36 mol/l.—Uranyl nitrate (323.7 g./l. (as U))
0.137 g./l.—Plutonium
2.0 mol/l.—$HNO_3$
0.02 mol/l.—$NaNO_2$
0.08 mol/l.—$Al(NO_3)_3$
(resulting from the cladding of the fuel element)
Other fission products (F. Ps.)

was fed into a first pulse column from the middle portion thereof (this solution contained 42.1 g. of U), and 91 ml. of 3.0 mol/l. $HNO_3$ was supplied from the top of the column as a washing solution, while 568 ml. of a TBP solution (30% (v./v.) in dodecane) was introduced into the column from the bottom.

The 30% dodecane solution of TBP taken out of the top of the first pulse column after the counter-current solute exchange. (TBP phase I) contained plutonium which was all tetravalent, and uranium (VI), and this TBP phase was introduced to the middle portion of a second pulse column. The aqueous solution withdrawn from the bottom of the first pulse column contained the fission products. In the second pulse column, 61 ml. of an aqueous solution comprising:

0.1 mol/l.—$HNO_3$
0.03 mol/l.—Ferrous sulfamate was introduced into the second column at the top thereof for back-extracting plutonium, while 120 ml. of a 30% (by volume) solution of TBP in dodecane was supplied to the same column from the bottom. From the bottom of the second column, 61 ml. of the aqueous solution in which plutonium had been back-extracted in the trivalent form, flowed out, while 600 ml. of the 30% solution of TBP in dodecane containing U(VI) (TBP phase II) issued from the top of the column.

The foregoing steps are part of the prior art known as the Purex process. In the conventional Purex process, the uranium is again back-extracted from this TBP phase II and precipitated, and the precipitate is ignited and reduced.

The uranium-containing TBP solution (TBP phase II) was divided into two portions each of 300 ml., which were separately distilled under reduced pressure by means of ordinary ground glass taper-joint apparatuses.

The pressure was set at 1–5 mm. Hg by means of a rotary pump with a 50 l./min. evacuating capacity.

The distillation flask was heated on an oil bath, in a mantle heater or on a sand bath.

A single distillation recovered 190 ml. in total of the dodecane at 100° C. and 68 ml. in total of the TBP at 120°–140° C. The residue was combined and baked in a quartz tube at 0.1 mm. Hg or less (with a 50 l./min. pump), at 600° C. for 5 hours, and in a Nichrome furnace at 1000° C. for 10–15 hours. Then, the baked material was ignited in a quartz beat placed in an alumina tube by means of a siliconite furnace under a vacuum of 0.1 mm. Hg or less as before at 1300° C. for 15 hours. The above procedure yielded 42 g. of dark brown $UO_2$ powder (37 g. of U). Since there is no loss of uranium at least in principle in the steps of the vacuum distillation and ignition steps, almost 100 percent of the uranium can be recovered, if the amount of the same which adheres to the container walls is made negligibly small.

On the other hand, in the conventional extraction steps, it seems inevitable because of distribution ratio that a small amount of uranium will be lost in the aqueous phase.

It seems probable that carbon and phosphorus may occur as impurities resulting from the TBP in the finished $UO_2$ product, but, upon analysis, it was found that the product fully meets the quality standards for $UO_2$ in use for the Japan Power Demonstration Reactor (JPDR) of the Japan Atomic Energy Research Institute.

Example 2

A solution (100 ml.) of spent thorium fuel comprising:

350 g./l.—Thorium
1.40 g./l.—Uranium (U)
0.6 mol/l.—Aluminum nitrate
(partly resulting from the cladding, and partly added intentionally)
0.06 mol/l.—Sodium fluoride
0.004 mol/l.—Mercuric nitrate
0.03 mol/l.—Phosphoric acid was fed to the middle portion of a first pulse column (A–1), while 100 ml. of a solution comprising:

0.5 mol/l.—Aluminum nitrate
0.03 mol/l.—Phosphoric acid
0.005 mol/l.—Ferrous sulfate was passed through the column from the top thereof. From the bottom, 500 ml. of 42.5% (v./v.) solution of TBP in kerosene was introduced into the column. The 42.5% kerosene solution of TBP taken out of the top of the column after the counter-current solute exchange, contained uranium and thorium extracted, and this solution was fed to a second pulse column (A–2) from the bottom. From the bottom of the first pulse column (A–1), the solution containing aluminum nitrate and the fission products was withdrawn. 910 ml. of a back-extracting solution containing 0.008 mol/l. $HNO_3$ was admitted into the second pulse column (A–2) at the top thereof to back-extract the thorium and uranium. From the bottom of the column, emerges 930 ml. of a dilute nitric acid solution containing the uranium and thorium. The above steps completed the removal of interfering metallic ions. Then, the above solution was concentrated by evaporation and 100 ml. of a solution containing:

350 g./l.—Thorium
1.40 g./l.—Uranium (U)
0.06 mol/l.—Aluminum nitrate was obtained and this was fed to the middle portion of another pulse column (B–1). From the top of pulse column B–1, 100 ml. of a solution of the same composition as the washing solution fed to the top of pulse column A–1 was introduced, while 500 ml. of 42.5% (by volume) solution of TBP in kerosene is fed to the bottom of the same column. The 42.5% TBP solution (TBP phase I) emerging from the top of pulse column B–1 after the counter-current extraction contained thorium and uranium, and was fed to the middle portion of still another pulse column B–2. In order that the thorium alone be back-extracted, 480 ml. of 0.24 mol/l. $HNO_3$ and 100 ml. of pure water were admitted at the top of pulse column B–2, while 160 ml. of 42.5% solution of TBP in kerosene was fed to the bottom of the column in order to re-extract the uranium which had been subjected to the back-extraction together with thorium. The 42.5% TBP kerosene solution of 660 ml., which had undergone the counter-current solute exchange and been taken out of the top of pulse column B–2 (TBP phase II) contained uranium alone, while a dilute nitric acid solution containing the back-extracted thorium issues from the bottom of the same column.

The foregoing steps of the operation are part of the prior art which is known as the Thorex process. In the conventional Thorex process, the uranium is again back-extracted from this TBP phase II, precipitated, and the precipitate is ignited and reduced.

TBP phase II (660 ml.) was divided into two portions of 330 ml. each, which were separately distilled under reduced pressure in the same manner as in Example 1. By single distillation, 360 ml. of kerosene and 190 ml. of TBP in total were recovered at 50°–60° C. and at 120°–140° C., respectively.

The residue was combined and ignited in the same manner as Example 1, whereupon 155 mg. of $UO_2$ (136.4 mg. of U) were obtained.

The quality of the TBP recovered and of the $UO_2$ obtained were identical with those of the respective substances obtained in Example 1.

QUALITY OF THE RECOVERED TBP

Figure 3:
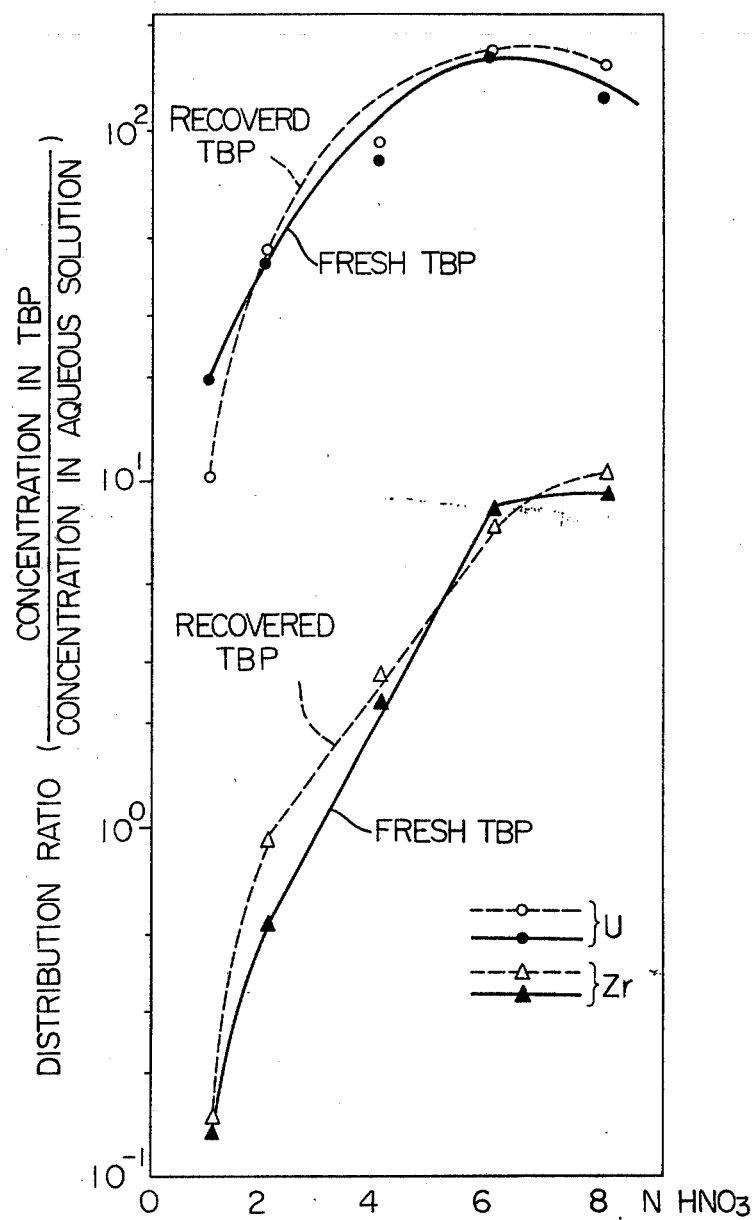
FIG. 3 is a diagram showing the results of study of the extracting ability of the TBP recovered in accordance with the process of this invention.

The quality of the recovered TBP was checked. The TBP recovered in Example 1 was, without being diluted, mixed with aqueous nitric acid solutions of various concentration each containing tracer amount of uranium or zirconium and distribution of these elements between the TBP and the nitric acid solutions was measured radiochemically. The same tests were carried out with respect to fresh TBP. The results are shown in FIG. 3. The quality of the recovered TBP is almost the same as that of fresh TBP.

What is claimed is:

1. A process for recovering uranium as uranium dioxide, said process comprising extracting an aqueous nitric acid solution containing uranium with an organic solvent containing tri-n-butyl phosphate, distilling the organic phase at a temperature of not more than 210° C. under a pressure of 1–5 mm. Hg, and igniting the distillation residue under a reduced pressure of 0.05–0.5 mm. Hg.

2. A process as claimed in claim 1 wherein the distilling is effected at a pressure of 1 to 2 mm. Hg.

3. A process as claimed in claim 1 wherein the igniting of the distillation residue is effected at a pressure of less than 0.1 mm. Hg.

4. A process as claimed in claim 1 wherein the igniting of the distillation residue is effected at a temperature of at least 1300° C.

5. A process as claimed in claim 1 wherein the igniting of the distillation residue is effected in two stages, the first stage being a baking stage and the second stage being effected at a temperature of at least 1300° C.

References Cited

UNITED STATES PATENTS 2,859,092   11/1958   Bailes et al. _____ 23—326

FOREIGN PATENTS 1,031,593   6/1966   Great Britain.

OTHER REFERENCES

Sicilio et al., Purification of Irradiated TBP by Distillation in Kerosene-Type Diluent, Nuclear Science and Engineering, 9, 455–461, 1961.

Burger, The Decomposition Reactions of TBP and Its Diluents and Their Effect on Uranium Recovery Processes, Progress in Nuclear Energy, Series III, vol. 2, pp. 307–319, 1958.

CARL D. QUARFORTH, Primary Examiner

MICHAEL J. McGREAL, Assistant Examiner